US009312598B1

(12) United States Patent
Callas

(10) Patent No.: US 9,312,598 B1
(45) Date of Patent: Apr. 12, 2016

(54) COMBINED FLOOR MAT AND ANTENNAS FOR AN ELECTRONIC ARTICLE SURVEILLANCE SYSTEM

(71) Applicant: Michael T. Callas, Minnetonka, MN (US)

(72) Inventor: Michael T. Callas, Minnetonka, MN (US)

(73) Assignee: CALLAS ENTERPRISES, LLC, Minnetonka, MN (US)

( * ) Notice: Subject to any disclaimer, the term of this patent is extended or adjusted under 35 U.S.C. 154(b) by 71 days.

(21) Appl. No.: 14/150,722

(22) Filed: Jan. 8, 2014

Related U.S. Application Data

(63) Continuation of application No. 12/322,846, filed on Feb. 9, 2009, now abandoned, which is a continuation-in-part of application No. 29/312,403, filed on Oct. 20, 2008, now abandoned, and a continuation-in-part of application No. 12/074,347, filed on Mar. 4, 2008, now abandoned.

(60) Provisional application No. 60/967,693, filed on Sep. 7, 2007.

(51) Int. Cl.
*G06K 7/08* (2006.01)
*H01Q 1/22* (2006.01)
*G08B 13/26* (2006.01)

(52) U.S. Cl.
CPC . *H01Q 1/22* (2013.01); *G08B 13/26* (2013.01)

(58) Field of Classification Search
CPC .......... G08B 13/2434; G08B 13/2402; G08B 13/2468; G08B 13/2474
USPC ............. 340/572.1–572.9, 10.1–10.6, 539.2, 340/550, 568.1, 573.1
See application file for complete search history.

(56) References Cited

U.S. PATENT DOCUMENTS

| | | | | |
|---|---|---|---|---|
| 4,476,459 | A * | 10/1984 | Cooper et al. | 340/572.4 |
| 5,103,235 | A * | 4/1992 | Clemens | 343/742 |
| 2005/0046572 | A1* | 3/2005 | Hader | 340/572.7 |
| 2007/0159332 | A1* | 7/2007 | Koblasz | 340/572.1 |
| 2009/0045954 | A1* | 2/2009 | Hall et al. | 340/568.1 |

FOREIGN PATENT DOCUMENTS

WO WO 2007097752 A1 * 8/2007 ............ G08B 13/24

* cited by examiner

*Primary Examiner* — Steven Lim
*Assistant Examiner* — Mancil Littlejohn, Jr.
(74) *Attorney, Agent, or Firm* — Richard John Bartz

(57) ABSTRACT

An electronic article surveillance system has transmitter and receiver antennas secured to the bottom of a floor mat to provide an interrogation zone above the mat and an electronic control unit operable to energize the transmitter antenna to provide an electromagnetic field in the interrogation zone and sense electric signals from the receiver antenna to produce an alarm indicating the presence of a tag in the interrogation zone.

12 Claims, 8 Drawing Sheets

COMBINED FLOOR MAT AND ANTENNAS FOR AN ELECTRONIC ARTICLE SURVEILLANCE SYSTEM

CROSS REFERENCE TO RELATED APPLICATION

This application is a continuation of application Ser. No. 12/322,846 filed Feb. 9, 2009. Application Ser. No. 12/322,846 is a continuation-in-part of U.S. application Ser. No. 29/312,403 filed Oct. 20, 2008 and U.S. application Ser. No. 12/074,347 filed Mar. 4, 2008. Application Ser. No. 12/074,347 claims the priority benefit of U.S. Patent Application Ser. No. 60/967,693 filed Sep. 9, 2007.

FIELD OF THE INVENTION

The invention is in the technology of floor mats and electronic article surveillance systems for detecting the unauthorized passage of articles or persons through passageways and exit doorways. The combined floor mat and electronic article surveillance system of the invention eliminates the use of upright side-by-side and overhead antennas to provide an electromagnetic interrogation zone to detect security tags associated with articles or persons.

BACKGROUND OF THE INVENTION

Electronic article surveillance systems are located adjacent exits of retail establishments, libraries and government buildings to detect unauthorized removal of articles from a particular location. Electronic article surveillance systems are radio frequency systems that have a transmitter antenna and a receiver antenna operable to establish an interrogation zone and tags which are attached to articles being protected. The antennas are located on upright tower structures adjacent opposite sides of exit passageways. The tower structures are visible obstructions that detract from the aesthetics of the exit passageway environment. The transmitter antenna coupled to electronic controller generates a variable frequency electromagnetic field within a range of a first predetermined frequency. The tags have resonant circuits having a predetermined resonant frequency generally equal to the first frequency. When one of the tags enters the interrogation zone the field generated by the transmitter antenna induces a voltage in the resonant circuit in the tag, which causes the resonant circuit to generate an electromagnetic field that disturbs the field in the interrogation zone. The reviewing antenna detects the electromagnetic field disturbance and generates a signal indicating the presence of the tag in the interrogation zone. Examples of electronic article surveillance systems with transmitter and receiver antennas are disclosed in U.S. Pat. Nos. 3,500,373, 5,103,235; 5,825,291 and 5,877,728. U.S. Pat. No. 4,135,184 discloses an electronic article surveillance system with upper and lower antennas arranged in horizontal planes below the floor and above the passageway. The lower antenna is designed for installation below the surface of the floor and out of view.

SUMMARY OF THE INVENTION

The invention comprises electronic article surveillance systems combined with floor mats and carpets having transmitter and receiver antennas operably to establish interrogation zones above the floor mats. The floor mats have bottom surfaces that cover floors, such as retail store exit passageways. Transmitter antennas attached to the bottom surfaces of the mats with covers are energized with electronic control units to establish interrogation zones above the mats. Receiver antennas retained on the bottom surfaces of the mats with covers surround the transmitter antennas sense signals caused by tags in the interrogation zone which result in an alarm indicating the presence of an active tag. The transmitter and receiver antennas include conductor members having double loop configurations secured to the bottom of the mats with covers, such as tapes and plastic coatings. The conductor members of the transmitter and receiver antennas can be embedded into the floor mat. Also, printed conductor ribbons can be secured to or applied directly on the bottom of the floor mat. The electronic article surveillance system with floor mats including transmitter and receiver antennas do not utilize tower or external structures that detract from the aesthetics of retail store environments.

DESCRIPTION OF THE PREFERRED EMBODIMENTS OF THE INVENTION

Figure 1:
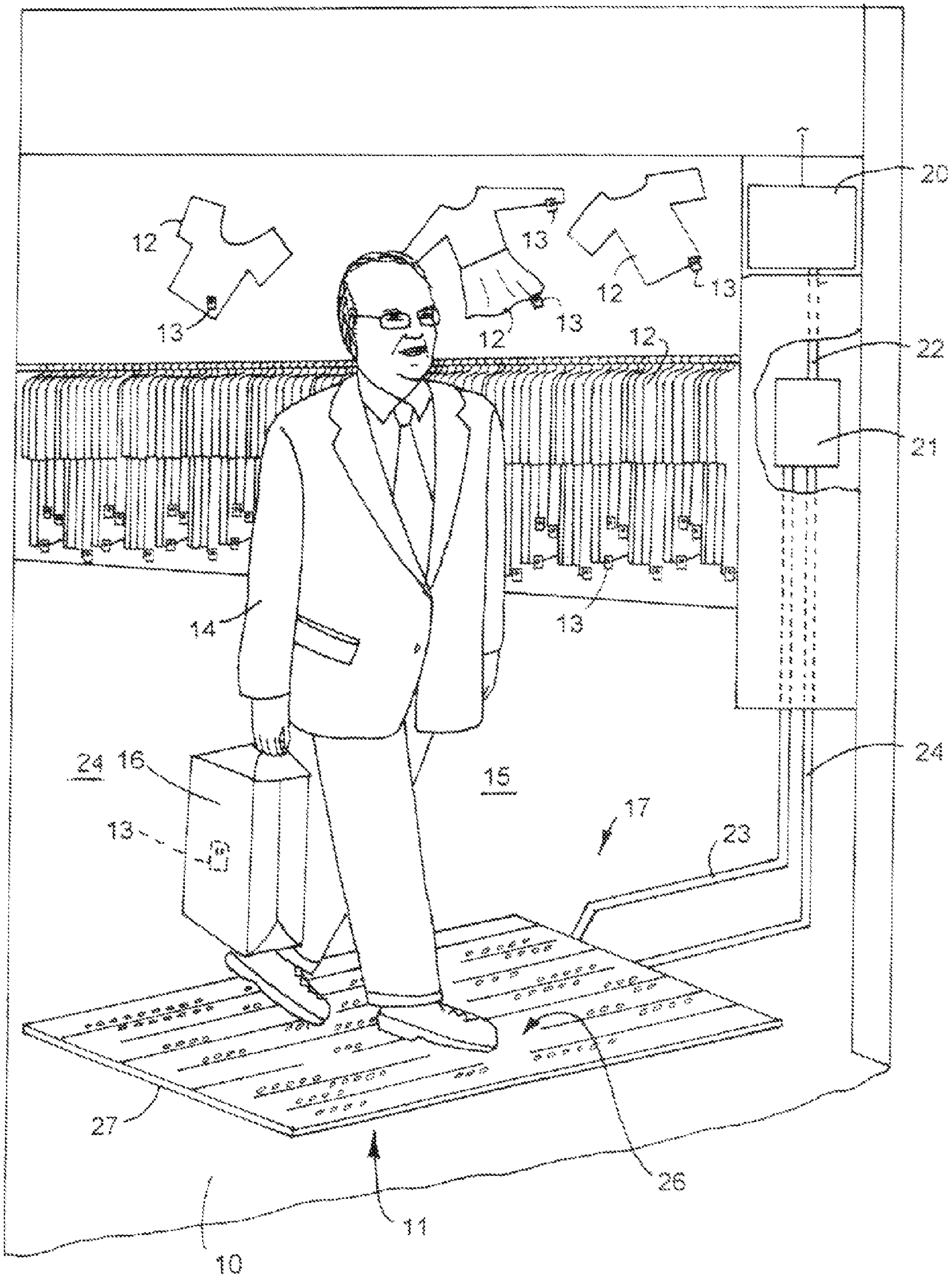
FIG. 1 is a perspective view of a retail store exit doorway having a floor mat with an electronic article surveillance system.

A retail store exit doorway 10, shown in FIG. 1, has a floor covered with a mat 11 having a fiber top surface 26 and an outer peripheral border or edge 27. An example of mat 1 and method of making the mat is disclosed by M. T. Callas in U.S. Pat. No. 6,258,202. Other types of floor mats and carpets can be used to cover the floor of doorway 10. Mats without edges can be used to cover entrance floors. Also, the size and shape of mat 11 can vary to fit the floor location accommodating the mat. The retail store has departments in which articles of merchandise 12 are displayed for inspection and sale. Identification markers or tags 13, attached to each article of merchandise have resonant electrical circuits that interact with an electromagnetic interrogation field to produce an audio or visual alarm. Tags 13 have coils connected in parallel with capacitors which are tuned to resonate at a selected frequency. Tags 13 are removed or rendered inoperative by authorized persons within the store when a legitimate sale is made. When a tag is not removed or rendered inoperative and carried by a person 14 in a bag 16 into an electromagnetic field or interrogation zone 15 above mat 11 of an electronic article surveillance system 17, an alarm is energized to produce an audio or visual signal that a tag is active indicating that an article of merchandise may not have been purchased or the tag deactivated.

Electronic article surveillance system 17 includes a transmitter antenna 18 attached to the bottom of mat 11 and a receiver antenna 19, surrounding transmitter antenna 18. Receiver antenna 19 is secured to mat 11 around and parallel to transmitter antenna 18. An electronic article surveillance control unit 21 coupled to a power supply 20 with cable 22 is wired to transmitter antenna 18 with cable 23 and to receiver antenna 19 with cable 24. Control unit 21 includes a swept frequency electrical detection system having electrical components that do not constitute novel features of the invention. An example of this system is shown and described in U.S. Pat. No. 3,500,373.

Figure 2:
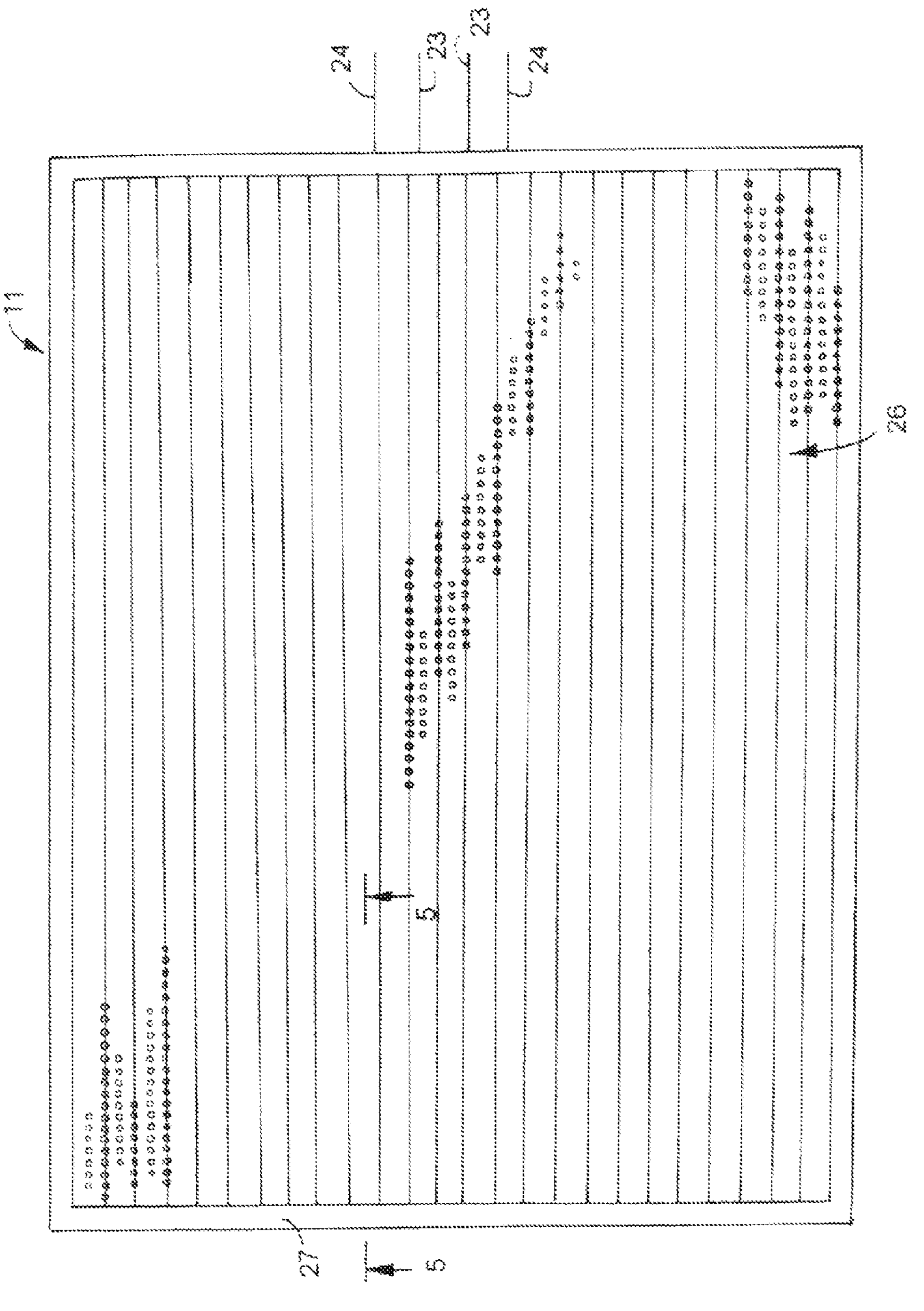
FIG. 2 is an enlarged top plan view of the floor mat of FIG. 1.
Figure 3:
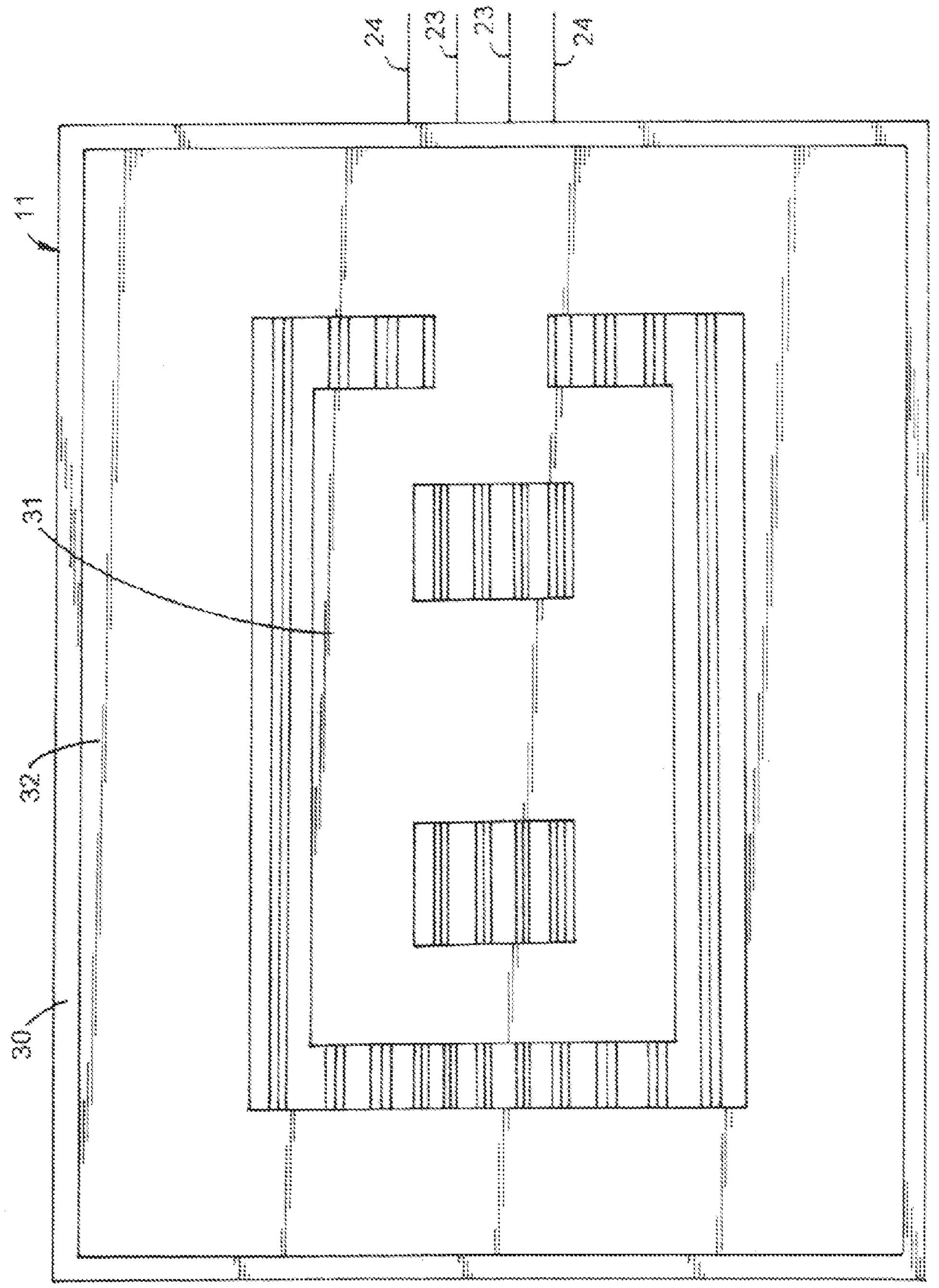
FIG. 3 is an enlarged bottom plan view of the floor mat of FIG. 1.
Figure 5:
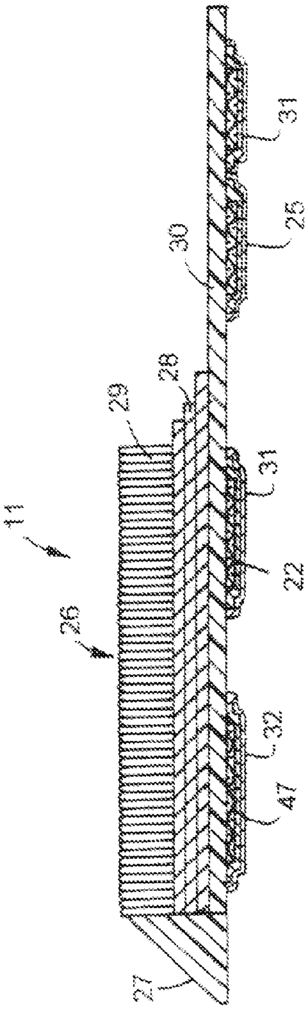
FIG. 5 is an enlarged sectional view taken along line 5-5 of FIG. 2.

As shown in FIG. 5, mat 11 has a flat greige base 28 and upright loop plastic fibers 29. Base 28 and fibers 29 are mechanically interlocked by needle punching and heat bonding. Fibers 29 are wear resistant plastic strands, such as nylon and polypropylene materials which do not absorb water. A bottom plastic sheet member or backing 30 supports base 28. A border or edge 27 surrounds fibers 29. The top of edge 27 has an upwardly and inwardly inclined surface. As shown in FIG. 3, backing 30 has longitudinal parallel ribs. Member 30 is a thermoplastic vinyl resin, such as polyvinyl chloride, having high friction and tacky properties. A method of making mat 11 is shown and described in U.S. Pat. No. 6,258,202. As shown in FIGS. 1 and 2, the top of mat 11 has the visual appearance of a conventional floor mat or carpet. The top surface 26 of mat 11 has uniform and continuous upright or looped fibers surrounded with a peripheral edge 27. Mat 11 can be a wall-to-wall carpet or carpet squares. Antennas and antenna structure are not visible by persons walking through doorway 10.

Returning to FIGS. 3 and 4, transmitter antenna 18 and receiver antenna 19 are located between backing 30 and covers 31 and 32. Covers 31 and 32 bond and hermetically seal antennas 18 and 19 to backing 30 thereby protecting and preventing deterioration of antennas 18 and 19. Covers 31 and 32 are elongated adhesive tapes that extend over antennas 18 and 19. Other types of covers and coatings can be used to attach antennas 18 and 19 to backing 30. Antennas 18 and 19 can be embedded into mat 11 below fibers 29.

Figure 4:
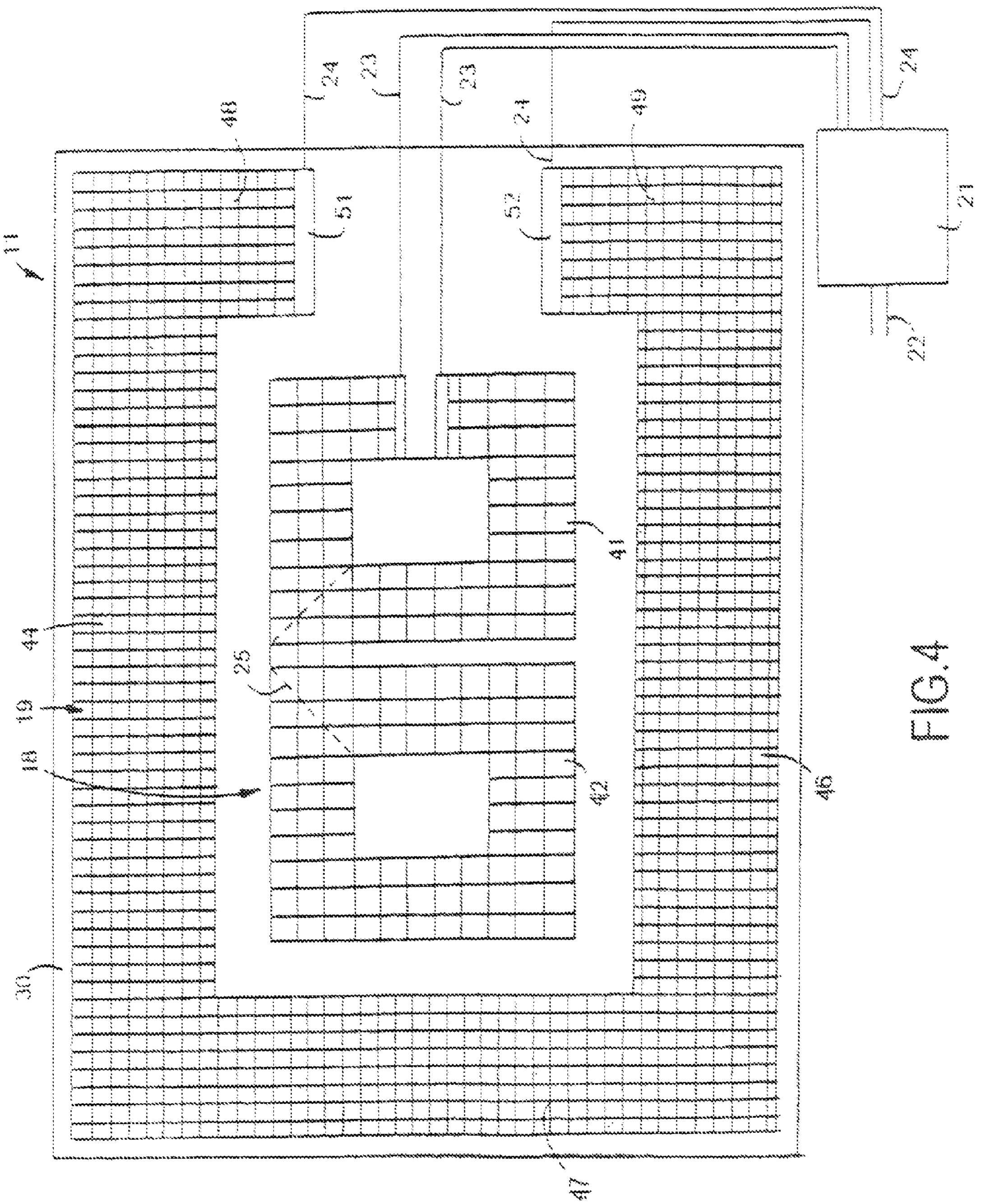
FIG. 4 is an enlarged bottom plan view of the floor mat of FIG. 1 showing the transmitter antenna and receiver antenna attached to the bottom of the floor mat.

As shown in FIG. 4, transmitter antenna 18 comprises a first conductor loop 41 and a second conductor loop 42. Loops 41 and 42 are electric conductor wire mesh members of generally equal dimensions and generally in the shape of a quadrilateral. A crossover conductor 25 connects adjacent portions of loops 41 and 42. The combined overall shape of antenna 18 is generally rectangular. Antenna 18 is surrounded by receiver antenna 19 for creating surveillance zone 15 above mat 11. Antennas 18 and 19 are located in the same horizontal plane along the bottom of mat 11. Antenna loops 41 and 42 are flat wire mesh members having uniform widths connected with crossover conductor 25. Loop 41 is wired to cables 23. Cables 23 are connected to the transmitter in control box 21. The mesh members are flat metal screens having woven longitudinal and transverse electric conducting wires of aluminum, copper, silver or bronze. Other electrical conductive materials can be used for antenna loops 41 and 42. As shown in FIG. 4, each loop 41 and 42 of antenna 18 has laterally spaced parallel side sections with square wave patterns or Cartesian arrangements. Cover 31 holds antenna 18 on the bottom of backing 30. Cover 31 is an adhesive tape that encloses and secures antenna 18 in a flat condition on the bottom of backing 30. The wires of antenna 18 are interlocking electrical conductors having a small tight mesh and a uniform width. Metal electrical conductive wires and amorphous core screens can be used as the mesh electric conductors. The mesh conductors have low inductance characteristics as compared to tube or wire antennas and uniform skin effect that increases signed transmission. In transmitter antenna first and second loops 41 and 42, the current flows in first loop 41 in a first direction and in second loop 42 in a second direction opposite to the current flow in first loop 41. The opposing currents generate magnetic fields of generally equal magnitudes opposite in direction. These magnetic fields substantially cancel in the far-field. For an antenna operating at 8.2 MHz the far-field is an area thirty meters or slightly less than one wavelength from the antenna.

Receiver antenna 19 is a flat metal wire mesh member looped around transmitter antenna 18. The wire mesh member is an aluminum screen having longitudinal side sections 44 and 46 spaced outwardly from and parallel to the longitudinal sections of transmitter antenna 18. Other types of electrical conductors can be used for antenna 19. The terminal ends 51 and 52 of end sections 48 and 49 are connected to cables 24. The opposite ends of sections 44 and 46 are joined to a transverse section 47. The mesh member has a uniform width which can vary between 8 to 45 cm. Cover 32 attaches antenna 19 to the bottom of backing 30.

Figure 6:
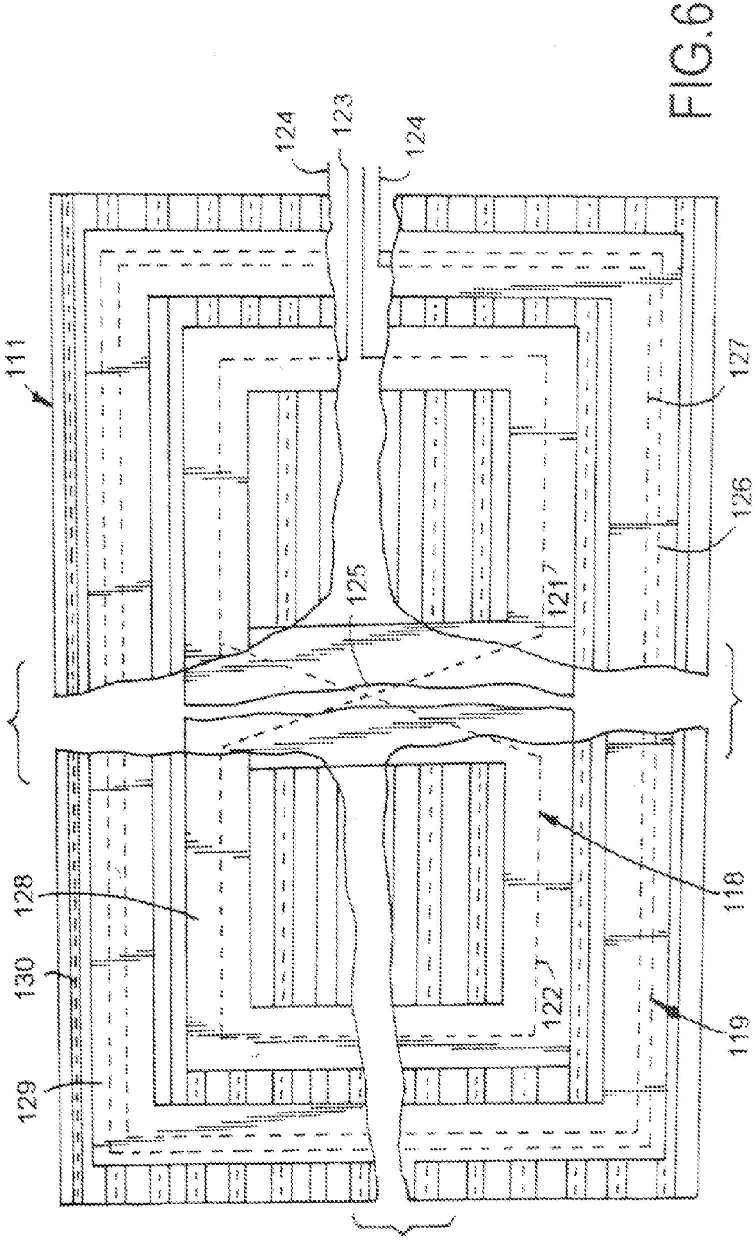
FIG. 6 is a foreshortened bottom plan view of a floor mat with a first modification of the transmitter antenna and receiver antenna attached to the bottom of the mat.

A first modification of the transmitter and receiver antennas 118 and 119, shown in FIG. 6, is located on and secured to the bottom 130 of mat 111. Antennas 118 and 119 can be secured to mat 111 with cover members 128 and 129. Examples of cover members are adhesive tapes as shown in FIG. 5. Alternatively, antennas 118 and 119 can be embedded into mat 111 below the mat fibers. Transmitter antenna 118 comprises first and second wire conductor loops 121 and 122 of generally equal dimensions and shape. A crossover conductor 125 connects adjacent shared adjacent sides of loops 121 and 122. Loop 121 is wired to conductors or cables 123 connected to an electronic article surveillance control unit, such as control unit 21 shown in FIG. 1. Loops 121 and 122 are coplanar and equal in length and size. The combination of the sizes of each loop 121 and 122, the magnitude of the currents within loops 121 and 122 and direction of the currents generate electric fields from each loop, when summed, net an electric field which approaches zero. The current in loops 121 and 122 flows in opposite directions and thereby generates substantially canceling electric fields. Loops 121 and 122 comprise wire conductors having a generally rectangular arrangement located side-by-side in a common plane along the bottom of mat 111.

Receiver antenna 119 has a pair of parallel wire conductors 126 and 127 looped around transmitter antenna 118 and wired to conductors or cables 124. Cover members 128 and 19 hold transmitter antenna 18 and receiver antenna 119 on bottom 130 of mat 111. Cover members 128 and 129 are adhesive tape or sheet members bonded to bottom 130 on mat 111. Adhesive or plastic materials can be used to secure transmitter antenna 118 and receiver antenna 119 to mat 111.

Figure 7:
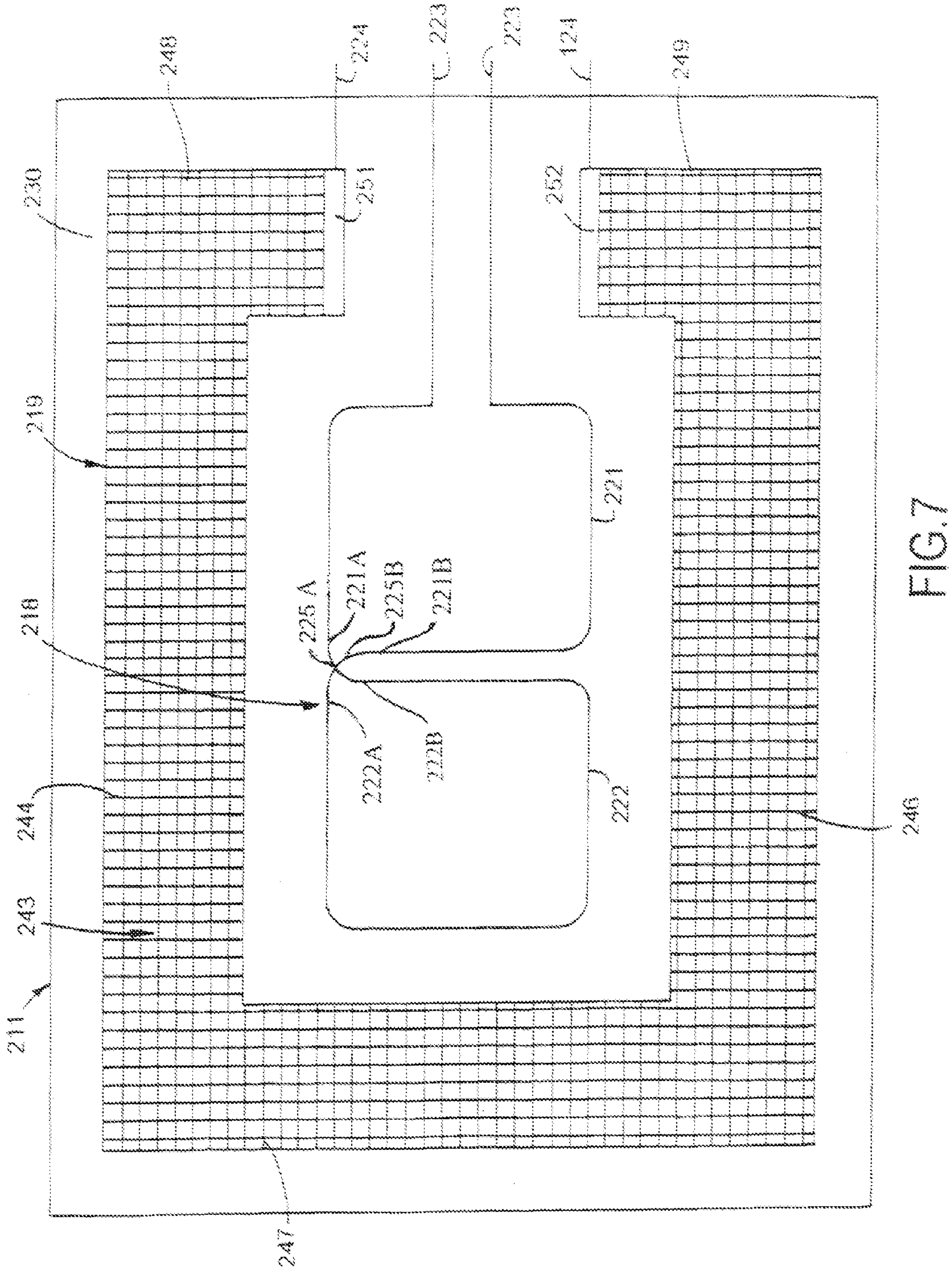
FIG. 7 is a bottom plan view of a floor mat with a second modification of the transmitter antenna and receiver antenna attached to the bottom of the mat.

A second modification of the transmitter antenna 218 and receiver antenna 219 secured to the bottom 230 of a floor mat 211 is shown in FIG. 7. Transmitter antenna 218 has a pair of loop wires 221 and 22 connected with a crossover conductor 225. Conductors or cables 223 connect loop wire 221 to the electronic control unit operable to establish an interrogation zone above mat 211.

Receiving antenna 219 is a flat metal wire mesh member 243 having a rectangular shape looped around transmitter antenna 218. Wire mesh member 243 has parallel side sections 244 and 246 joined to end sections 247, 248 and 249.

Side and end sections 244, 246, 247, 248 and 249 have the same width and wire conductors. Terminal ends 251 and 252 of sections 248 and 249 are spaced from each other and wired to conductors or cables 224 connected to an electronic article surveillance control unit. Wire mesh member 243 is a metal screen having a small tight mesh. The screen has woven longitudinal and transverse electric conducting wires of aluminum, copper, silver or bronze. Other electrical conductive materials can be used for wire mesh member 243.

Figure 8:
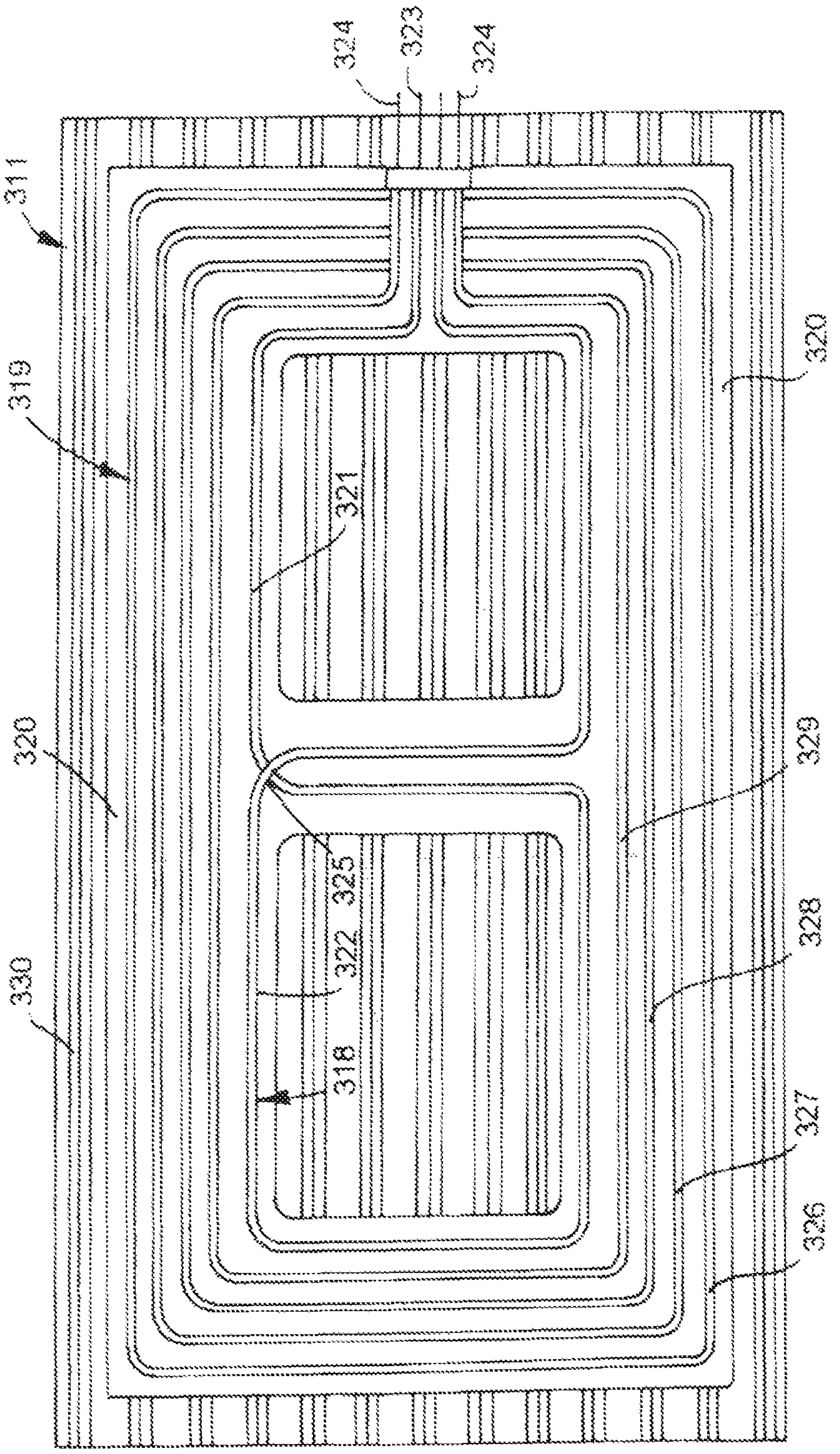
FIG. 8 is a bottom plan view of a floor mat with a third modification of the transmitter antenna and receiver antenna attached to the bottom of the mat.

A third modification of the transmitter antenna 318 and receiver antenna 319, shown in FIG. 8, is secured to the bottom 330 of floor mat 311 with a plastic sheet member 320. An adhesive or bonding material is used to attach sheet member 320 to bottom 330 of mat 311. Other types of fasteners can be used to connect sheet member 320 to mat 311. Transmitter antenna 318 comprises a conductor ribbon or printed conductor having a first conductor loop 321 and a second conductor loop 322 interconnected with a crossover conductor 325. Loops 321 and 322 and crossover conductor 325 are secured to sheet member 320. First conductor loop 321 is wired to conductors or cables 323 connected to an electronic control unit. Conductor loops 321 and 322 are coplanar and equal in length and size. The combination of the sizes of each loop 321 and 322, the magnitude of the currents within the loops, and direction of the currents generate electric fields from each loop, when summed, net an electric field which approaches zero. The current in loops 321 and 322 flows in opposite directions and thereby generates substantially canceling electric fields. Loops 321 and 322 can be electric conductor wires attached to sheet member 320 or secured with an adhesive or plastic material directly to the bottom 320 of mat 311. The conductor ribbons of loops 321 and 322 can be applied to or printed on the bottom 330 of mat 311.

Figure 9:
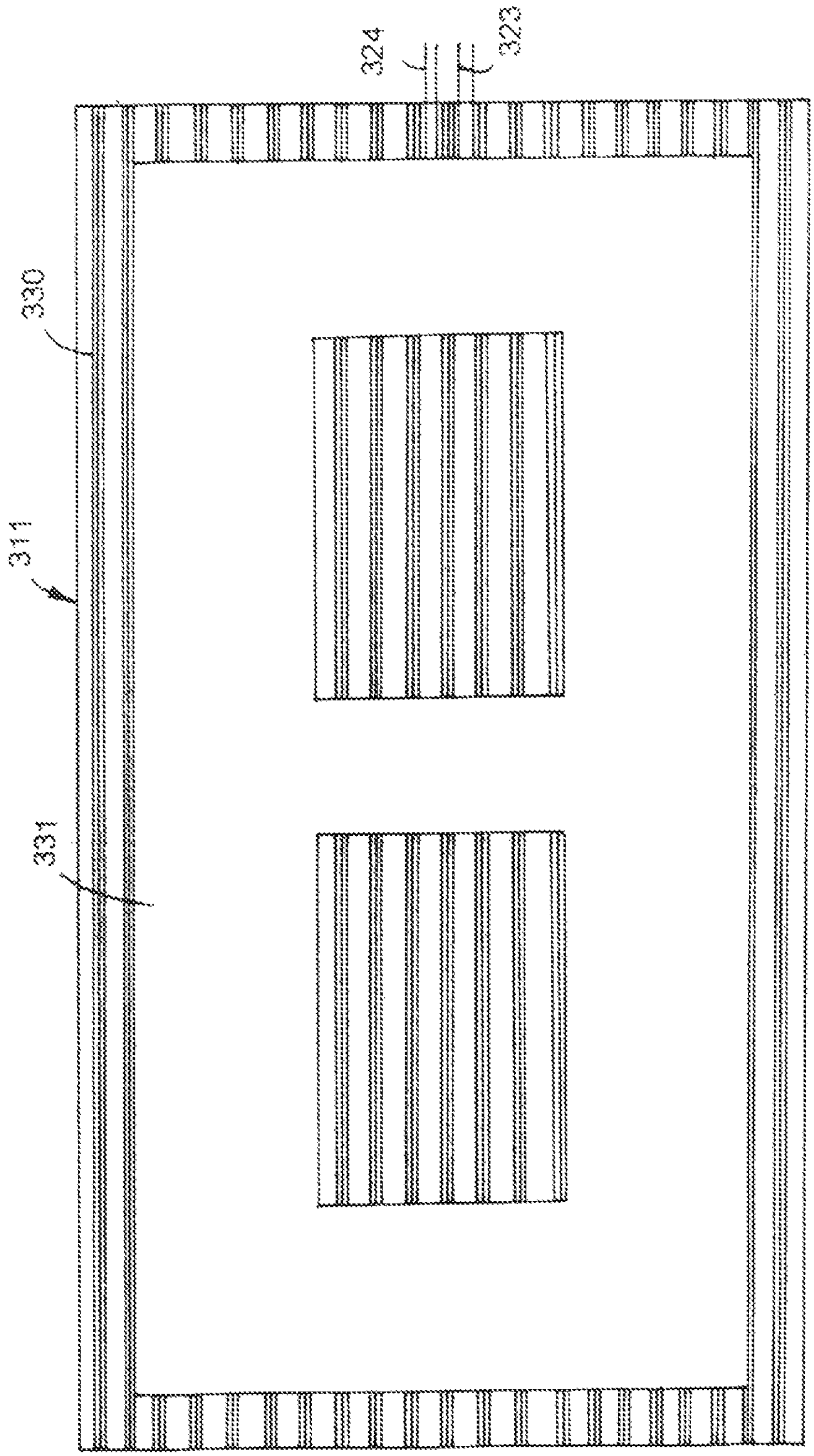
FIG. 9 is a bottom plan view of the floor mat of FIG. 8 showing the cover member located over the transmitter antenna and receiver antenna.

Receiver antenna 319 comprises a plurality of conductor ribbons or printed conductors 326, 327, 328 and 329 located around transmitter antenna 318. Conductors 326 to 329 are secured to sheet member 320. Adjacent conductors 326 to 329 are laterally spaced an equal distance from each other and have terminal ends connected to conductors or cables 324. Conductors 323 and 324 are wired to an electronic article surveillance control unit operable to generate an interrogation zone above mat 311. Conductors 326 to 329 can be electric conductor wires attached to sheet member 320 or secured with an adhesive or plastic material directly to the bottom 330 of mat 311. The conductor ribbons of receiver antenna 319 can be applied to or printed on the bottom 330 of mat 311 and covered with a sheet member 331. As shown in FIG. 9, sheet member 331 is located over transmitter antenna 318 and receiver antenna 319 to protect the conductors of antennas 318 and 319. Sheet member 320 can also be secured to bottom 330 of mat 311 with antennas 318 and 319 located between sheet member 320 and bottom 330 of mat.

Several modifications of the combined floor mat and transmitter and receiver antennas for an electronic article surveillance system have been shown in the drawing and described herein. It is understood that additional modifications and changes in the floor mat, carpet and antennas can be made by persons skilled in the art without departing from the invention.

The invention claimed is:

1. An electronic article surveillance environment comprising:

a building having a floor, an interior space above the floor, a doorway open to the space and an exit location adjacent the doorway, a generally flat pad, said pad including a bottom member having a bottom surface located on the floor adjacent the doorway, first and second outer peripheral side portions and first and second outer peripheral end portions, a plurality of articles located in the space, a tag having a resonant electric circuit attached to each of the articles, an electronic article surveillance system comprising an electronic signal transmitter antenna located on the bottom surface of the bottom member of the pad, said transmitter antenna including a first wire electric conductor having first and second substantially equal wire loop electric conductors operable to establish an electronic interrogation zone above the pad, said first loop conductor having a first end and a second end, said second loop conductor having a first end and a second end located adjacent said first and second ends of the first loop conductor, a first cross over electric conductor joined to the first end of the first loop conductor and the second end of the second loop conductor, a second cross over electric conductor joined to the first end of the second loop conductor and the second end of the first loop conductor whereby the electric current in the first and second loop conductors flows in opposite directions to generate substantially canceling electric fields, third electric conductors connected to the first loop electric conductor, an electronic signal receiver antenna located on the bottom surface of the bottom member of the pad, said receiver antenna having at least four second wire electric conductors surrounding the first and second substantially equal wire loop electric conductors for creating an electronic interrogation zone in the space above the pad, said second wire conductors being spaced inwardly from said first and second outer peripheral side portions and the first and second outer peripheral end portions of the pad, adjacent second wire electric conductors being spaced from each other in concentric locations on the bottom surface of the bottom member of the pad, each of said second wire electric conductors having first and second ends adjacent the first outer peripheral end portion of the pad, said transmitter antenna and receiver antenna being located on the bottom surface of the bottom member of the pad in substantially the same plane, fourth electric conductors connected to the first and second ends of each of said wire electric conductors of the receiver antenna, a cover located over the transmitter antenna and the receiver antenna and securing the transmitter antenna and the receiver antenna to said bottom surface of the bottom member of the pad, and an electronic control unit connected to the third and fourth electric conductors operable to energize the transmitter antenna to establish the electronic interrogation zone vertically above the pad located on the floor adjacent the doorway and to sense electronic signals established by one or more tags located in the interrogation zone by the receiver antenna and produce an alarm indicating the presence of one or more tags in the interrogation zone.

2. The electronic article surveillance environment of claim 1 wherein:

the first and second loop conductors and first and second cross over conductors of the transmitter antenna comprises a continuous wire conductor ribbon.

3. The electronic article surveillance environment of claim 1 wherein:

the second wire conductors of the receiver antenna comprise wire conductor ribbons located around the transmitter antenna.

4. An electronic article surveillance method characterized by:

providing a building having a floor, an interior space above the floor, a doorway open to the space and an exit location adjacent the doorway;

locating a mat including a bottom member having a bottom surface on the floor adjacent the doorway;

locating a transmitter antenna on the bottom surface of the bottom member of the mat operable to establish an electronic interrogation zone above the mat;

locating a receiver antenna having four electric conductors with first and second ends on the bottom surface of the bottom member of the mat;

laterally spacing the adjacent electric conductors from each other in concentric locations on the bottom surface of the bottom member of the mat, connecting the first ends of the four electric conductors to a first common electric conductor, connecting the second ends of the four electric conductors to a second common electric conductor, surrounding the transmitter antenna around the receiver antenna located on the bottom surface of the bottom member of the mat;

covering the transmitter and receiver antennas with at least one sheet member secured to the bottom surface of the bottom member of the mat;

connecting an electronic control unit to said transmitter antenna and said first and second common electric conductors of the receiver antennas, energizing the transmitter antenna to establish the electronic interrogation zone above the mat;

sensing electric signals with the receiver antenna triggered by a tag having a resonant electric circuit located in the interrogation zone, and using the sensed electric signal to activate an alarm indicating the presence of the tag in the interrogation zone.

5. An electronic article surveillance apparatus comprising:

a mat having a bottom member with a bottom surface adapted to be located adjacent a passage of a structure, an electronic signal receiver antenna located on the bottom surface of the bottom member of the mat operable to sense an electronic signal in an electronic interrogation zone adjacent the mat, said signal receiver antenna having at least four electric conductors, adjacent electric conductors being laterally spaced from each other, said at least four electric conductors each having first and second ends, adjacent said electric conductors being laterally spaced from each other in concentric locations on the bottom surface of the bottom member of the mat, a first common electric conductor connected to the first ends of the at least four electric conductors, a second common electric conductor connected to the second ends of the at least four electric conductors, a sheet member located over the receiver antenna to retain the receiver antenna on the bottom surface of the bottom member of the mat, and an electronic control unit connected to said first and second common electric conductors operable to energize the receiver antenna to sense electric signals triggered by a tag having a resonant electric circuit located in the interrogation zone and cause an alarm indicating the presence of the tag in the electronic interrogation zone.

6. The electronic article surveillance apparatus of claim 5 wherein:

the at least four electric conductors have parallel side portions and parallel end portions joined to the parallel side portions.

7. The electronic article surveillance apparatus of claim 6 wherein:

the parallel side portions of the at least four electric conductors are longer than the parallel end portions of the at least four electric conductors.

8. An electronic article surveillance apparatus comprising:

a pad adapted to be located adjacent a passage of a structure, an electronic signal receiver antenna on the pad operable to sense an electronic signal in an electronic interrogation zone adjacent the pad, said signal receiver antenna having at least four electric conductors, adjacent said electric conductors being laterally spaced from each other in concentric locations on the pad, said at least four electric conductors each having first and second ends, a first common electric conductor connected to the first ends of the at least four electric conductors, a second common electric conductor connected to the second ends of the at least four electric conductors, and an electric control unit connected to said first and second electric conductors operable to sense electric signals triggered by a tag having an electric signal circuit located in the electronic interrogation zone and cause an alarm indicating the presence of the tag in the electronic interrogation zone.

9. The electronic article surveillance apparatus of claim 8 including:

a cover attached to the pad and located over the receiver antenna.

10. The electronic article surveillance apparatus of claim 8 wherein:

the at least four electric conductors have parallel side portions and parallel end portions joined to the parallel side portions.

11. The electronic article surveillance apparatus of claim 10 wherein:

the parallel side portions of the at least four electric conductors are longer than the parallel end portions of the at least four electric conductors.

12. The electronic article surveillance apparatus of claim 8 wherein:

the pad has a generally rectangular shape having opposite peripheral sides, said at least four electric conductors having parallel side portions located adjacent the opposite peripheral sides of the pad.

* * * * *